United States Patent [19]
Leonhartsberger et al.

[11] Patent Number: 5,580,587
[45] Date of Patent: Dec. 3, 1996

[54] MOLD CHANGING DEVICE IN INJECTION MOLDING MACHINE

[75] Inventors: Heinz Leonhartsberger, Schwertberg; Friedrich Kühberger, Saxen; Franz Peirlberger, Schönau, all of Austria

[73] Assignee: Engel Maschinenbau Gesellschaft m.b.H., Schwertberg, Austria

[21] Appl. No.: 233,969

[22] Filed: Apr. 28, 1994

[30]   Foreign Application Priority Data

Apr. 28, 1993 [AT] Austria ................................ 829/93

[51] Int. Cl.$^6$ ........................................... B29C 3/00
[52] U.S. Cl. ...................... 425/183; 425/185; 425/186; 425/190; 425/195; 425/575
[58] Field of Search ...................... 425/183, 185, 425/186, 190, 195, 575

[56]   References Cited

U.S. PATENT DOCUMENTS

| | | | |
|---|---|---|---|
| 5,004,413 | 4/1991 | Stopforth | 425/186 |
| 5,232,716 | 8/1993 | Seto et al. | 425/186 |
| 5,256,053 | 10/1993 | Haguchi | 425/186 |
| 5,356,279 | 10/1994 | Füller et al. | 425/186 |
| 5,358,398 | 10/1994 | Brown et al. | 425/186 |
| 5,362,434 | 11/1994 | Hauser et al. | 425/186 |
| 5,401,157 | 3/1995 | Kato et al. | 425/186 |
| 5,401,158 | 3/1995 | Kubota et al. | 425/186 |

FOREIGN PATENT DOCUMENTS

| | | |
|---|---|---|
| 3717944 | 1/1988 | Germany . |
| 3801032 | 7/1989 | Germany . |
| 3636090 | 5/1990 | Germany . |
| 3940127 | 6/1990 | Germany . |
| 4006975 | 10/1990 | Germany . |

*Primary Examiner*—Timothy McMahon
*Attorney, Agent, or Firm*—Wenderoth, Lind & Ponack

[57]   ABSTRACT

A rubber injection molding machine includes a mold rack, an injection position with lower and upper platens and an operator station. Rolling beams are mounted at opposite sides of the injection position and can be lifted and lowered. Between such beams is a mold carrier which can be moved in the rolling direction of the beams. The mold carrier grasps a clamping pin of a bottom half of the mold.

20 Claims, 4 Drawing Sheets

MOLD CHANGING DEVICE IN INJECTION MOLDING MACHINE

BACKGROUND OF THE INVENTION

The invention relates to a mold changing device in a vertical injection molding machine, especially a rubber injection molding machine, including an injection position or assembly with lower and upper platens, and an operator station, whereby during normal molding operations, a lower mold half is moved by a sliding table or slide plate from the injection position to the operator station and back.

SUMMARY OF THE INVENTION

The object of the invention is to provide a molding changing device for a molding machine of the aforementioned type, which makes it easy to handle a mold without any additional means, such as a travelling crab, cranes, stacker trucks or the like.

This object is achieved according to the invention by providing on opposite sides of the lower platen rolling beams which can be lifted and lowered and between which moves a mold carrier which is attached or fastened to the sliding table. The mold carrier moves in the rolling direction of the rolling beams.

A mold easily can be moved from a mold storage rack to the injection position by means of the rolling beams that can be lifted and lowered. The rolling beams when lowered do not prevent in any way the mold from being clamped for normal injection operations. The movement of the mold can be facilitated by moving the mold carrier by a hydraulic or pneumatic cylinder.

BRIEF DESCRIPTION OF THE DRAWINGS

An embodiment of the invention is described in detail in the following with reference to the enclosed drawings, wherein.

DETAILED DESCRIPTION OF THE INVENTION

Figure 1:
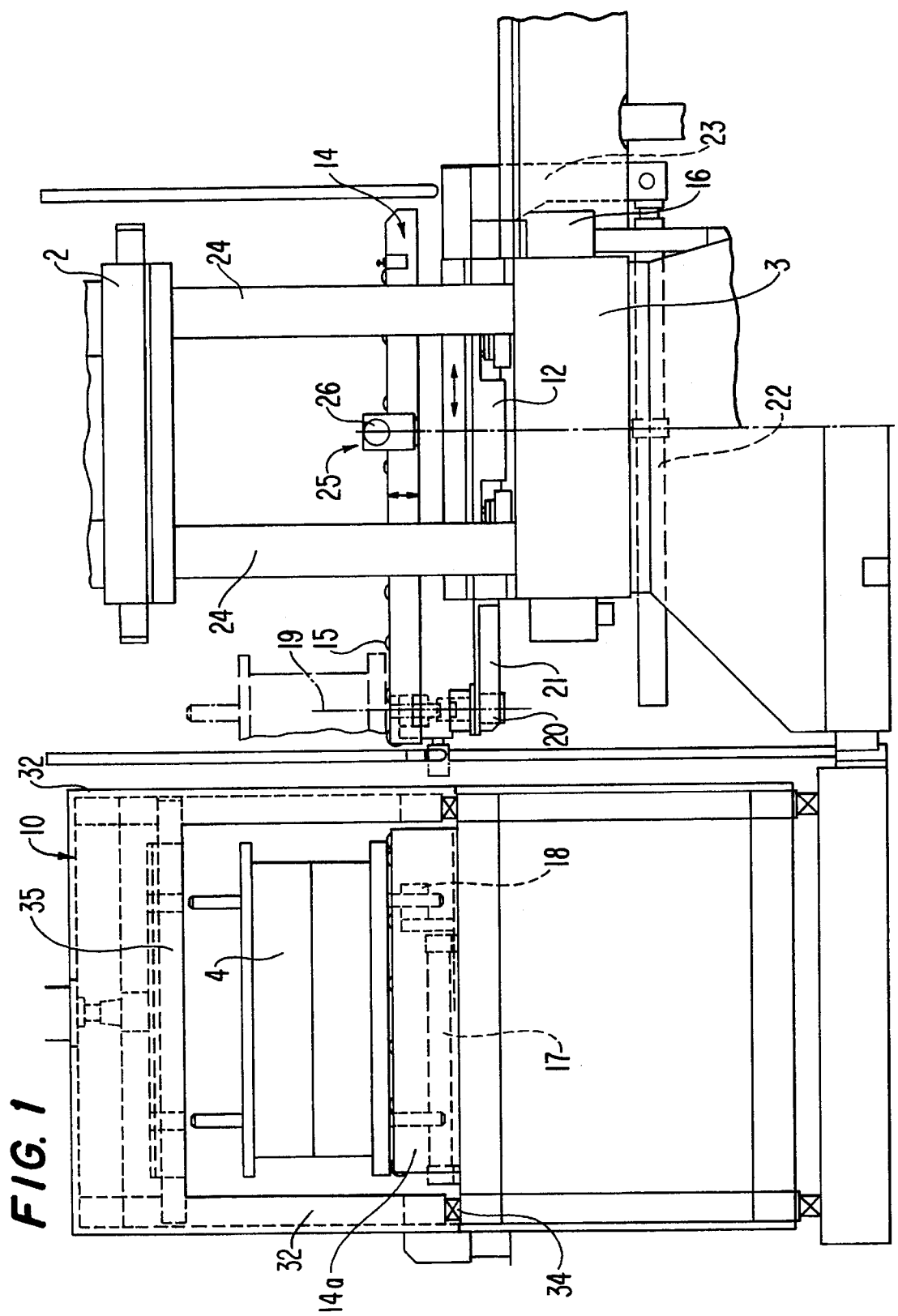
FIG. 1 is a side view of a rubber injection molding machine with a mold changing device according to the invention.
Figure 2:
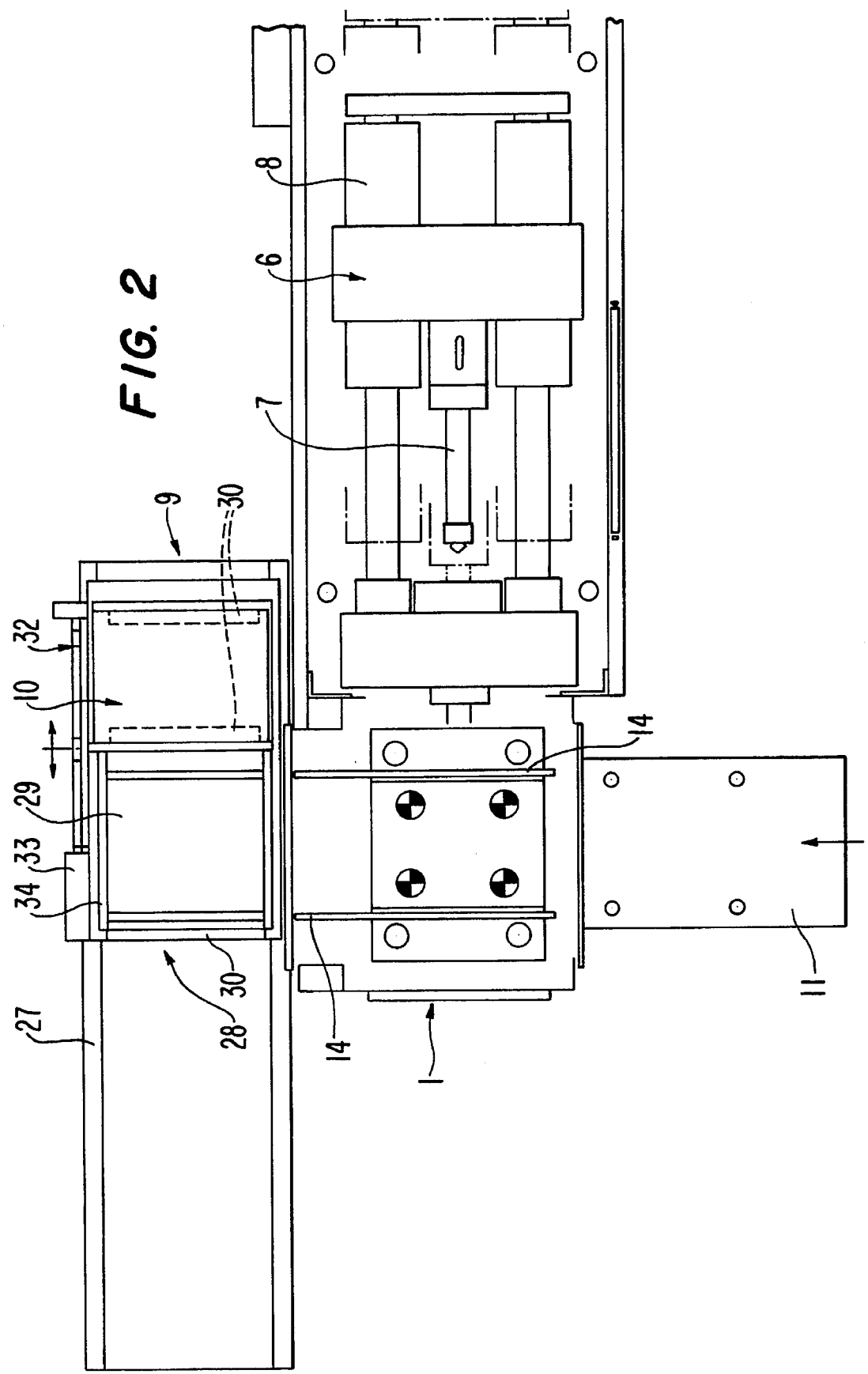
FIG. 2 is a top view of a rubber injection molding machine with a mold changing device according to the invention.

An injection molding machine includes an injection position or station i with upper and lower platens 2, 3 to which mold halves 4 can be clamped with clamping pins 5. The platens 2, 3 are connected by way of columns 24. On a side of the injection position 1 is an injection unit 6 with a plasticizing cylinder 7 and two injection cylinders 8. The injection unit 6 is fabricated by conventional methods according to the state of the art.

Behind the injection position 1 is a mold rack 9 which supports molds, each of which comprises two mold halves 4. The mold rack 9 includes rails 27 on which a carriage 28 can be moved. Carriage 28 has two mold stations 29 for two molds, each of which comprises two mold halves 4. The mold stations 29 are delimited by separating walls 30 which are insulated against heat. The mold stations 29 are covered alternatingly by a tunnel hood 10 which includes front and rear cover walls 32. The tunnel hood 10 can be moved on rails 34 by means of a displacing cylinder 33. Within the tunnel hood 10 there is a heater or hotplate 35. Prior to use, a mold is heated by means of the tunnel hood 10 and the hotplate 35.

In front of the injection position 1 is an operator station 11 where injection moldings are removed from the bottom mold half 4 and where new gating parts, for example bolts, are installed into cavities of the mold in order to inject rubber material around them at the injection position.

Two rolling beams 14 are mounted at the injection position 1 at the bottom platen 3, with a slide plate 12 and a bottom hotplate 13 between beams 14. The rolling beams 14, which are provided with rows of rollers 15, can be lifted and lowered by means of synchronized hydraulic cylinder 16. Similarly, there are rolling beams 14a on the mold rack 9. The rolling beams 14a are aligned with rolling beams 14 when rolling beams 14 are raised, but the rolling beams 14 are rigidly mounted. Below the mold halves 4 between the rolling beams 14a is a pneumatic cylinder 17 with a mold carrier 18 which grasps a clamping bolt 5 of the bottom mold half 4.

Figure 3:
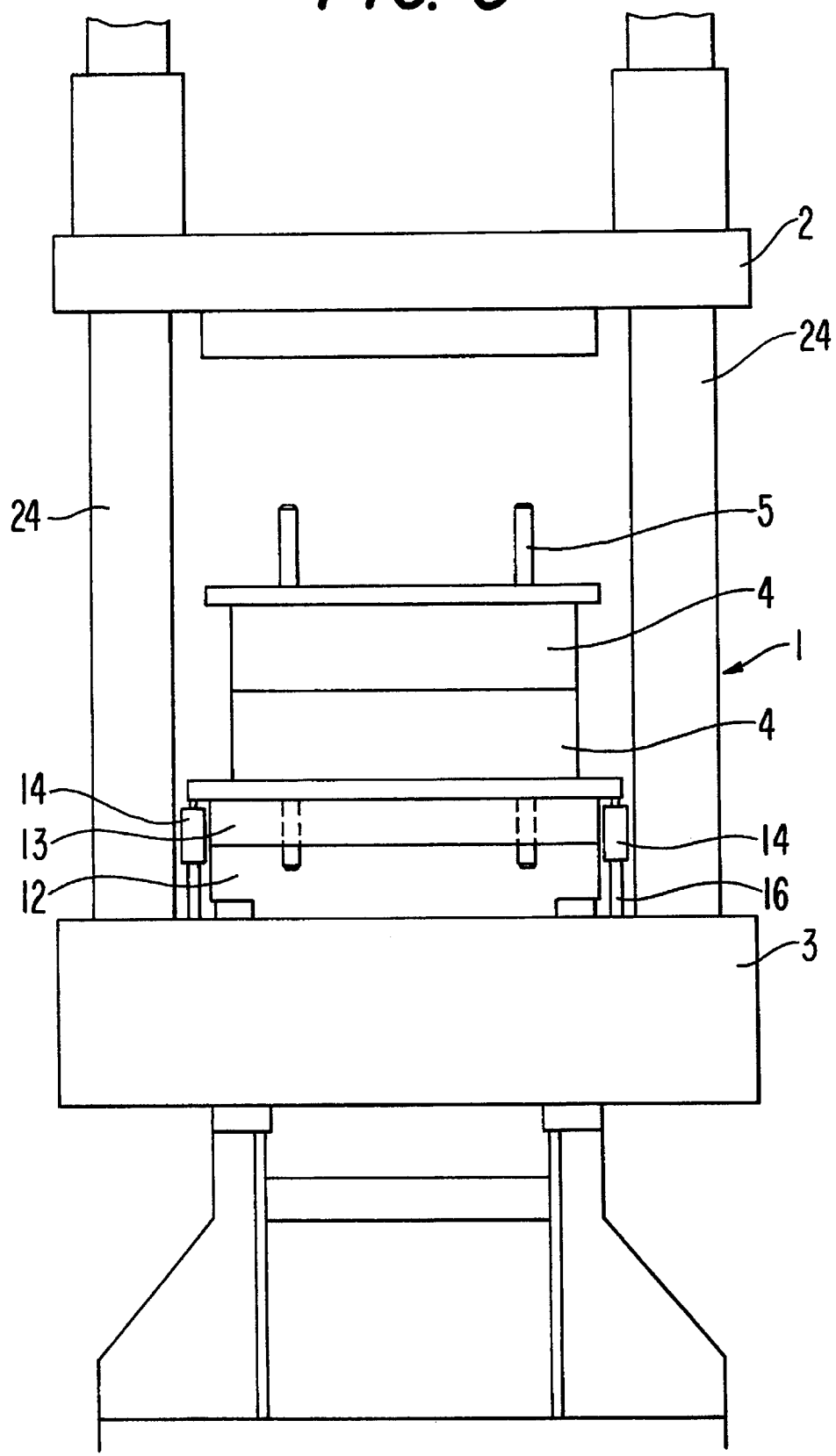
FIG. 3 is a view from the direction of the arrow of FIG. 2.
Figure 4:
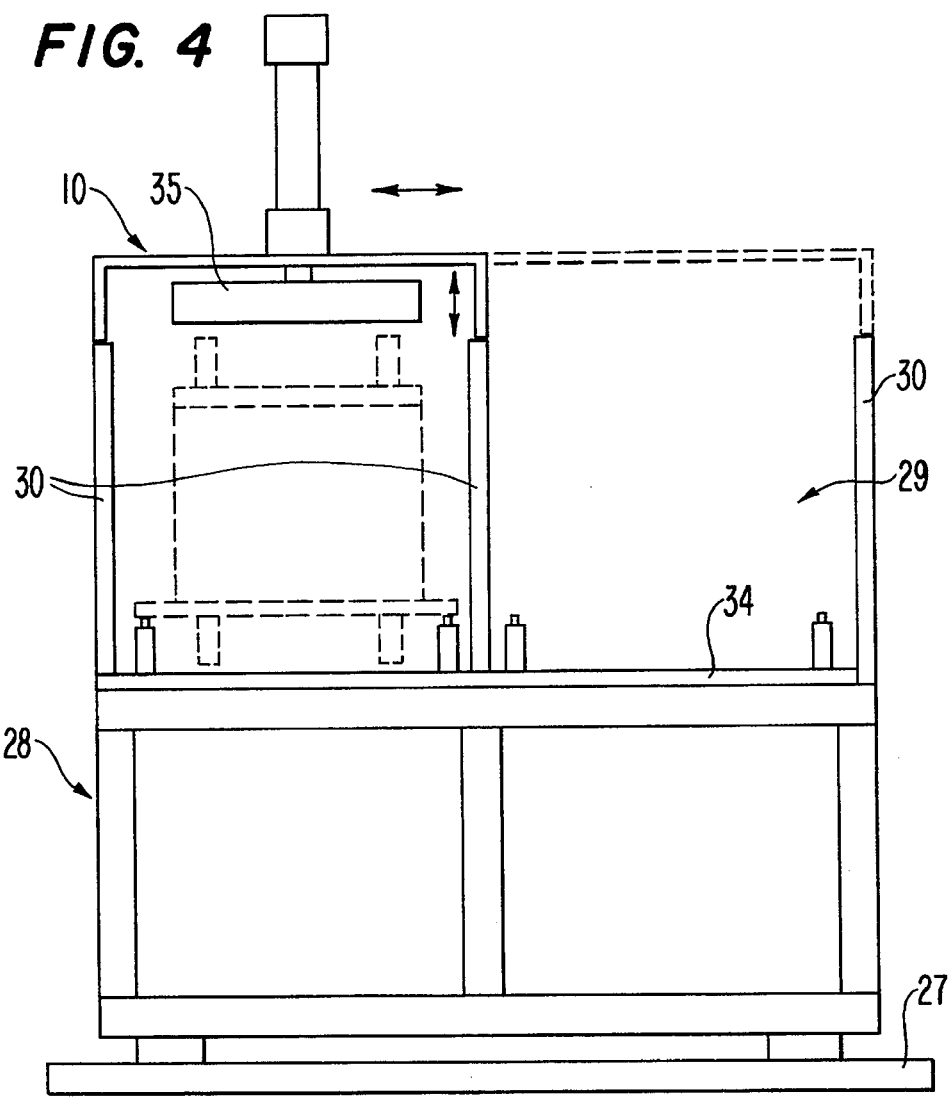
FIG. 4 is a vertical view of a mold rack with tunnel hood.
Figure 5:
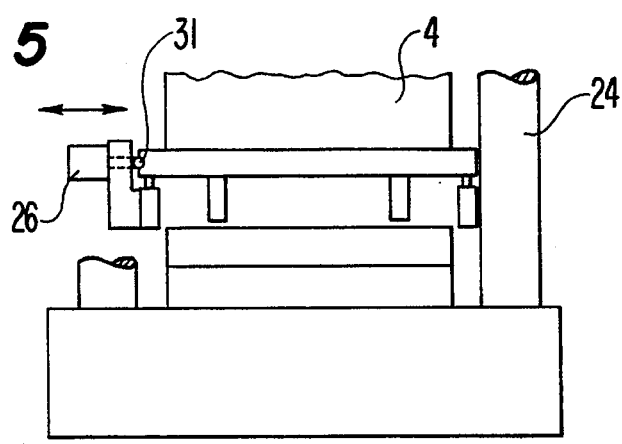
FIG. 5 is a schematic view of a stop mechanism for the mold.

By operating the pneumatic cylinder 17 the mold can be moved to the right (as viewed in FIG. 1) until the clamping bolt 5 is at a transfer position 19, as illustrated in FIG. 1 by dash-dotted lines. The mold halves 4 thus roll from the rolling beams 14a onto the rolling beams 14. When the mold halves 4 of the mold are in the position 19, mold carrier 18 releases the clamping bolt 5 to a mold carrier 20 below the mold carrier 18. Then the mold carrier 18 is returned to its original position by the piston rod of the pneumatic piston 17. Mold carrier 20, which is attached to an extension arm 21 of the slide plate 12, grasps the clamping bolt 5 of the bottom mold half 4. At this stage the mold halves 4 can be moved further to the right by the mold carrier 20 by means of hydraulic cylinder 22 which grasps a crossarm 23 of the slide plate 12, until the mold halves 4 are in the injecting position, i.e. in the position shown in FIG. 3. The mold halves then are clamped by the plates 2, 3. In this position the bottom mold half 4 is clamped by pistons 26 of clamping mechanisms 25, e.g. by pin 31 of mechanism 25 fitting into a lateral depression in the lower mold half. The mold carrier 20 moves with the slide plate 12 back into the starting position shown in FIG. 1. To enable the platens 2, 3 to clamp the mold halves 4, the rolling beams 14 first are lowered into the position shown in FIG. 3, so that the bottom mold half 4 rests directly on the hotplate 13 and the clamping pins 5 thereof project into the slide plate 12.

During normal molding operations, the bottom mold half 4 is moved relative to the operator 11, i.e. back and forth between injection position 1 and operator station 11. Thus, the mold half 4 is moved with the slide plate 12 by means of the hydraulic cylinder 22 to the operator station 11, where the injection moldings are removed and parts around which material is to be injected are installed, in the conventional manner.

When it is necessary to replace the mold halves, the mold halves 4 are moved back to the mold rack 9 in the reverse order. That is, the clamping pins 5 are detached from the slide plate 12 at the injection position by raising the rolling beams 14 by means of the cylinders 16. Subsequently the slide plate 12 is moved to the right until the mold carrier 20 grasps the right clamping pin 5 of the bottom mold half 4.

At this stage the slide plate 12 and the mold carrier 20 move to the left and move the mold from the molding region into the intermediate or transfer position 19 shown in FIG. 1 with the dash-dotted line. During this stage the mold carrier 20 can be moved relative to the mold rack 9 until the mold carrier 18 of the pneumatic cylinder 17 can grasp the right (FIG. 1) clamping pin 5 of the bottom mold half 4, whereupon the two mold halves 4 can be deposited as a whole on the mold rack 9.

We claim:

1. A vertical injection molding machine having a mold changing device, said machine comprising:

an injection station having thereat lower and upper platens to hold therebetween a mold for an injection molding operation;

an operator station at a first side of said injection station;

a mold storage rack at a second side of said injection station opposite said operator station;

a slide plate mounted on said lower platen for movement relative thereto in opposite directions back and forth between said injection station and said operator station during normal molding operations and for selective movement back and forth from said injection station toward said mold storage rack during a mold changing operation;

rolling beams mounted on opposite sides of said slide plate for vertical movement between a lowered position, whereat a mold at said injection station is maintained lowered relative to said lower platen, and an upper position, whereat a mold at said injection station is lifted by said rolling beams away from said lower platen; and a mold carrier connected to said slide plate and movable therewith to, when said rolling beams are in said upper position, move a mold lifted by said rolling beams in a direction from said injection station toward said mold storage rack and to move a new mold in a reverse direction, with the molds being rollingly moved along said rolling beams.

2. A machine as claimed in claim 1, further comprising a hydraulic or pneumatic cylinder unit mounted to impart said movement to said slide plate.

3. A machine as claimed in claim 2, wherein said cylinder unit is mounted beneath said lower platen.

4. A machine as claimed in claim 1, wherein said mold carrier has a configuration to enable grasping thereby of a clamping pin depending downwardly of the mold.

5. A machine as claimed in claim 1, further comprising a hot plate positioned on said slide plate between said rolling beams.

6. A machine as claimed in claim 1, wherein said mold carrier is attached to an extension arm projecting from said slide plate.

7. A machine as claimed in claim 1, further comprising an additional mold carrier mounted on said mold storage rack and operable to move a mold therefrom to a transfer position.

8. A machine as claimed in claim 7, wherein said transfer position is located between said mold storage rack and said injection station.

9. A machine as claimed in claim 7, further comprising a pneumatic or hydraulic cylinder mounted on said mold storage rack and operable to control movement of said another mold carrier.

10. A machine as claimed in claim 7, wherein said slide plate is operable to move said mold carrier and a mold carried thereby to said transfer position.

11. A machine as claimed in claim 10, wherein both said mold carrier and said another mold carrier are operable at said transfer position to simultaneously grasp a same clamping pin depending downwardly from a mold.

12. A machine as claimed in claim 7, further comprising additional rolling beams mounted on said mold storage rack in alignment with said rolling beams when said rolling beams are in said upper position thereof.

13. A machine as claimed in claim 1, further comprising an injection unit extending perpendicularly to said rolling beams.

14. A machine as claimed in claim 1, further comprising hydraulic cylinders mounted to move said rolling beams upwardly and downwardly.

15. A machine as claimed in claim 1, wherein at least one said rolling beam has mounted thereon a stop mechanism for arresting movement of a mold along said rolling beams.

16. A machine as claimed in claim 14, wherein said stop mechanism includes a pin fittable into a depression in the mold.

17. A machine as claimed in claim 15, wherein said pin is operable by a pneumatic or hydraulic cylinder.

18. A machine as claimed in claim 1, further comprising a tunnel hood movably mounted on said mold storage rack.

19. A machine as claimed in claim 1, wherein said mold storage rack includes longitudinal rails, a carriage movable along said rails, and plural mold stations on said carriage and delimited by front and rear cover walls and heat insulated side walls.

20. A machine as claimed in claim 19, further comprising a tunnel hood having a heater and mounted for movement over said mold stations.

\* \* \* \* \*